United States Patent [19]

Inokuchi et al.

[11] Patent Number: 5,259,259
[45] Date of Patent: Nov. 9, 1993

[54] MOTION CONVERTING MECHANISM AND ROTARY TOOL

[75] Inventors: Katsuhisa Inokuchi; Mitsuhide Inokuchi, both of Nagoya, Japan

[73] Assignee: Tokuden Kosumo Kabushiki Kaisha, Nagoya, Japan

[21] Appl. No.: 969,374

[22] Filed: Oct. 30, 1992

Related U.S. Application Data

[62] Division of Ser. No. 690,916, Jun. 21, 1991, Pat. No. 5,176,038.

[30] Foreign Application Priority Data

Nov. 7, 1989 [JP] Japan .................. 1-129961
Jan. 18, 1990 [JP] Japan .................... 2-3436
Mar. 15, 1990 [JP] Japan .................. 2-26434

[51] Int. Cl.⁵ .............. F16H 27/02; B25B 13/00
[52] U.S. Cl. ..................... 74/131; 81/58.1; 192/48.92
[58] Field of Search ............ 74/34, 129, 130, 131, 74/132; 81/58, 58.1, 58.3, 58.4, 60; 192/48.92

[56] References Cited

U.S. PATENT DOCUMENTS

| | | | |
|---|---|---|---|
| 337,973 | 3/1886 | Monger et al. | 74/132 |
| 566,198 | 8/1896 | Livoni | 74/131 |
| 616,540 | 12/1898 | King | 81/58.1 |
| 2,529,476 | 11/1950 | Albertson | 81/58.1 |
| 2,697,381 | 12/1954 | Maillard | 74/129 |
| 3,124,010 | 3/1964 | Eady | 74/132 X |
| 3,756,090 | 9/1973 | Mella et al. | 74/130 |
| 4,078,438 | 3/1978 | Starbard | 74/34 |
| 4,512,217 | 4/1985 | Conover | 74/129 |
| 4,800,785 | 1/1989 | Christensen | 81/58.1 |

FOREIGN PATENT DOCUMENTS

| | | | |
|---|---|---|---|
| 437426 | 5/1912 | France | 74/132 |
| 948540 | 8/1949 | France | 74/132 |
| 5467 | of 1889 | United Kingdom | 74/131 |

Primary Examiner—Leslie A. Braun
Assistant Examiner—David W. Laub
Attorney, Agent, or Firm—Dennison, Meserole, Pollack & Scheiner

[57] ABSTRACT

A rotary tool, such as a screwdriver, in which a grip is grasped and released, so that the output shaft is rotated in the same direction during both actions comprises a motion converting mechanism wherein two sets of one-way clutch mechanisms are added to a mechanism for converting a rectilinear reciprocating motion into a rotary motion through a rack gear and pinion combination. The two sets of one-way clutch mechanisms include one that engages during the reverse movement of the rack gear, both of which rotate an output shaft in the same direction when they engage. With this arrangement, the motion converting mechanism according to the present invention rotates the output shaft in the same direction during both forward and reverse movements of the rack gear, thereby improving efficiency in converting the reciprocating motion into the rotary motion.

3 Claims, 10 Drawing Sheets

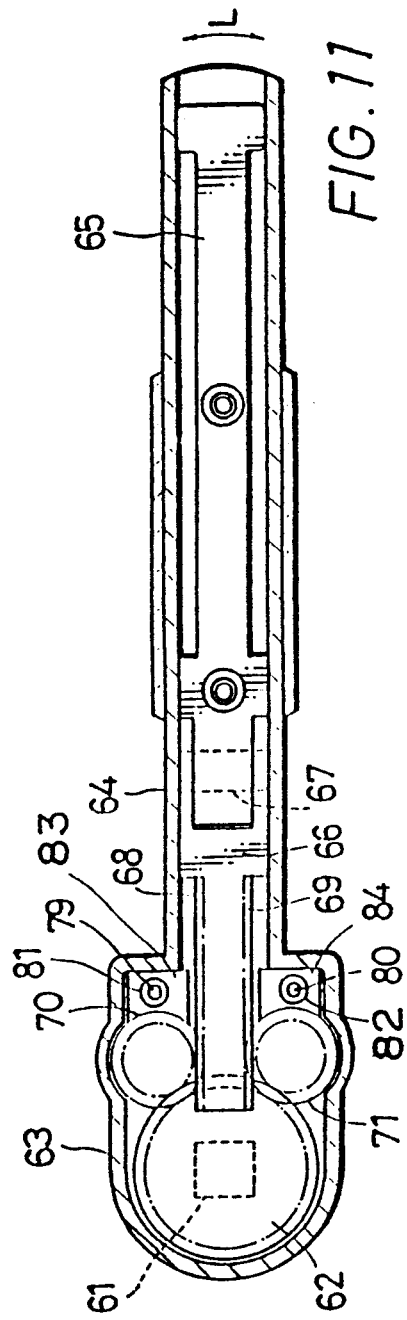
FIG.11
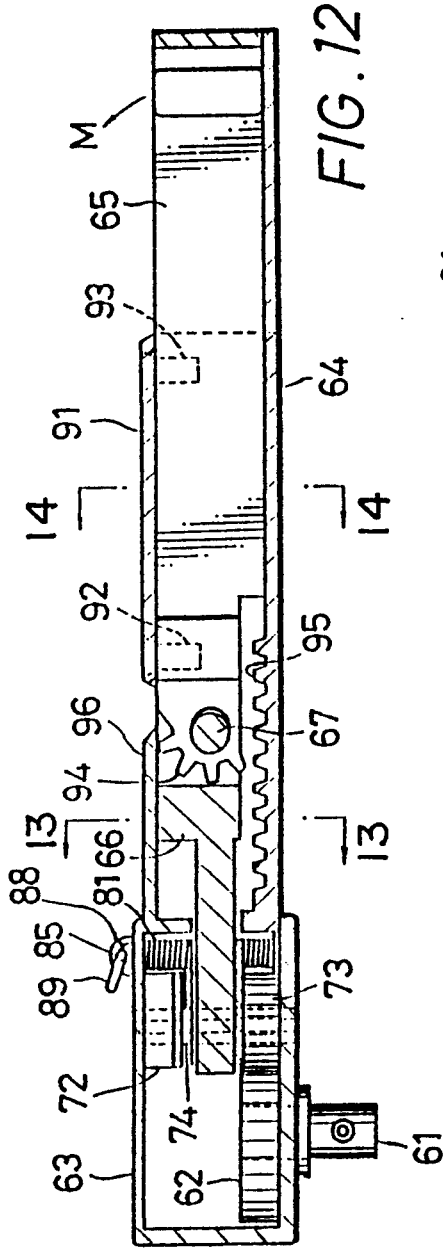
FIG.12
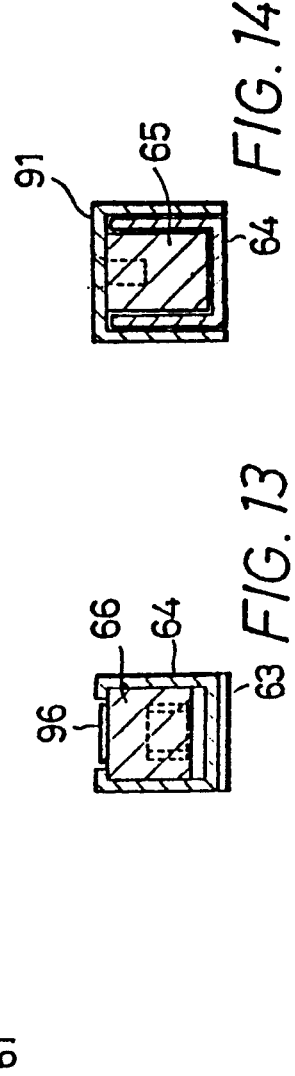
FIG.14
FIG.13

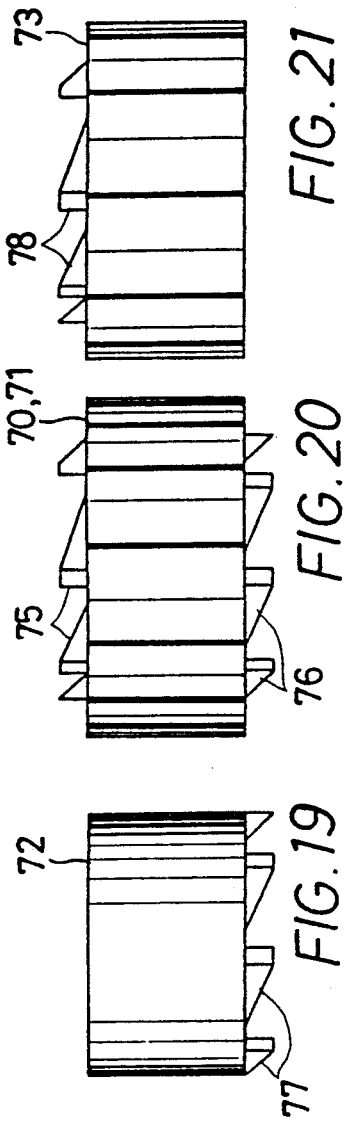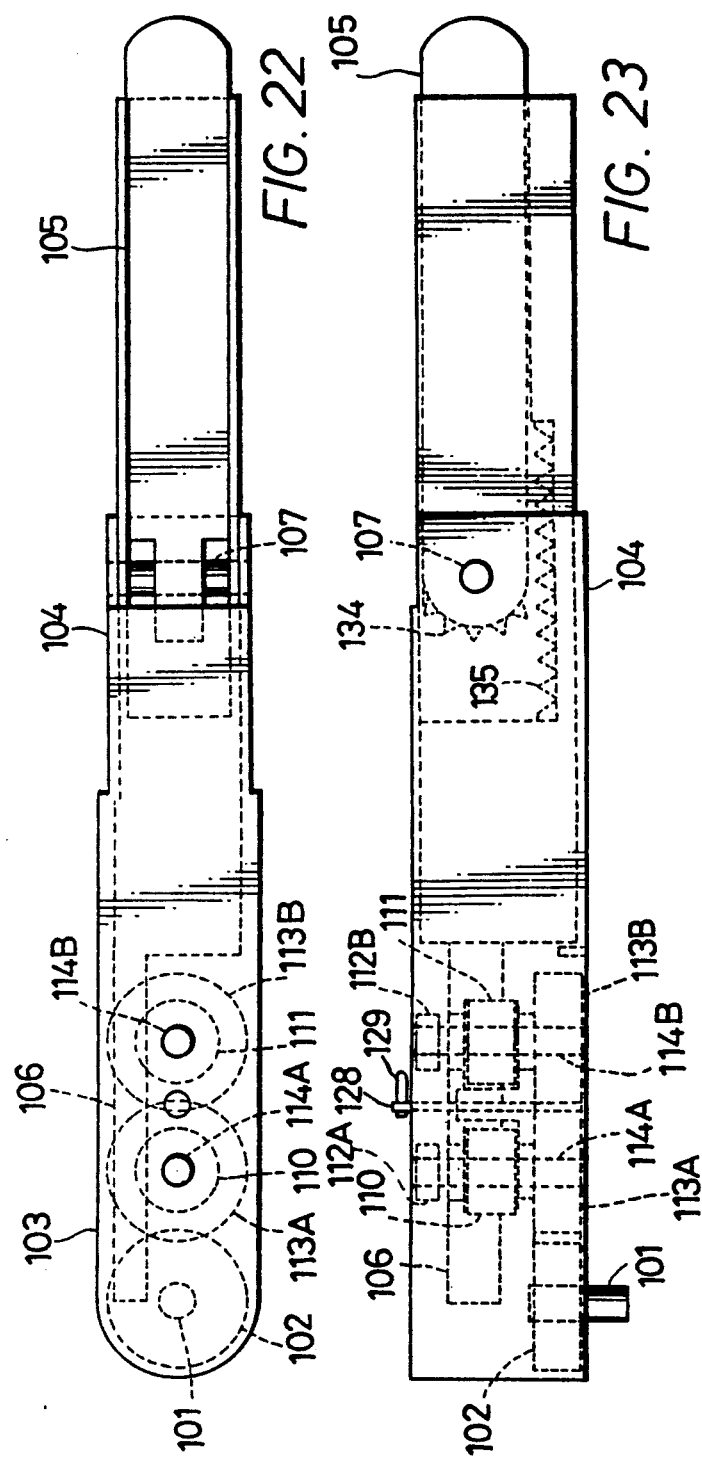

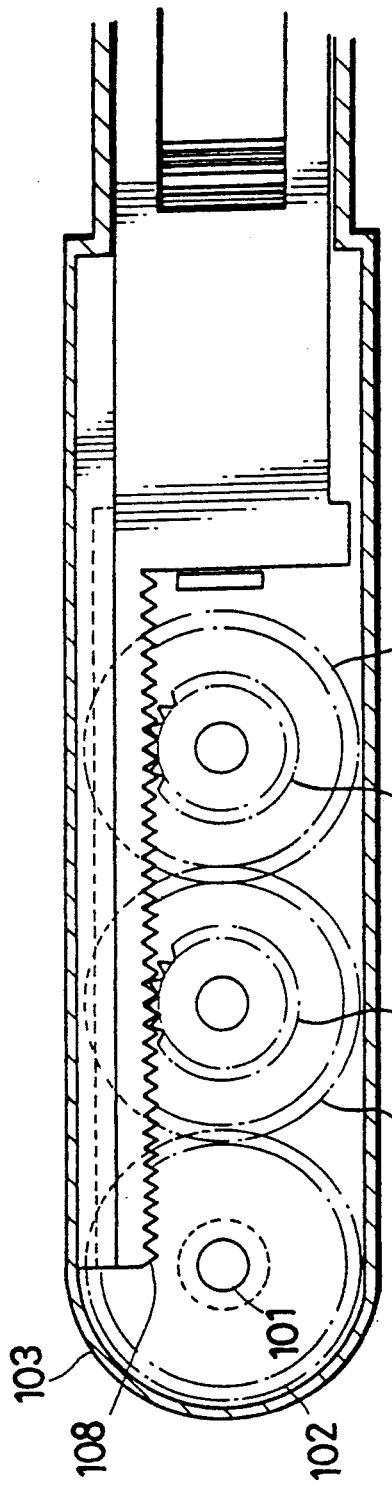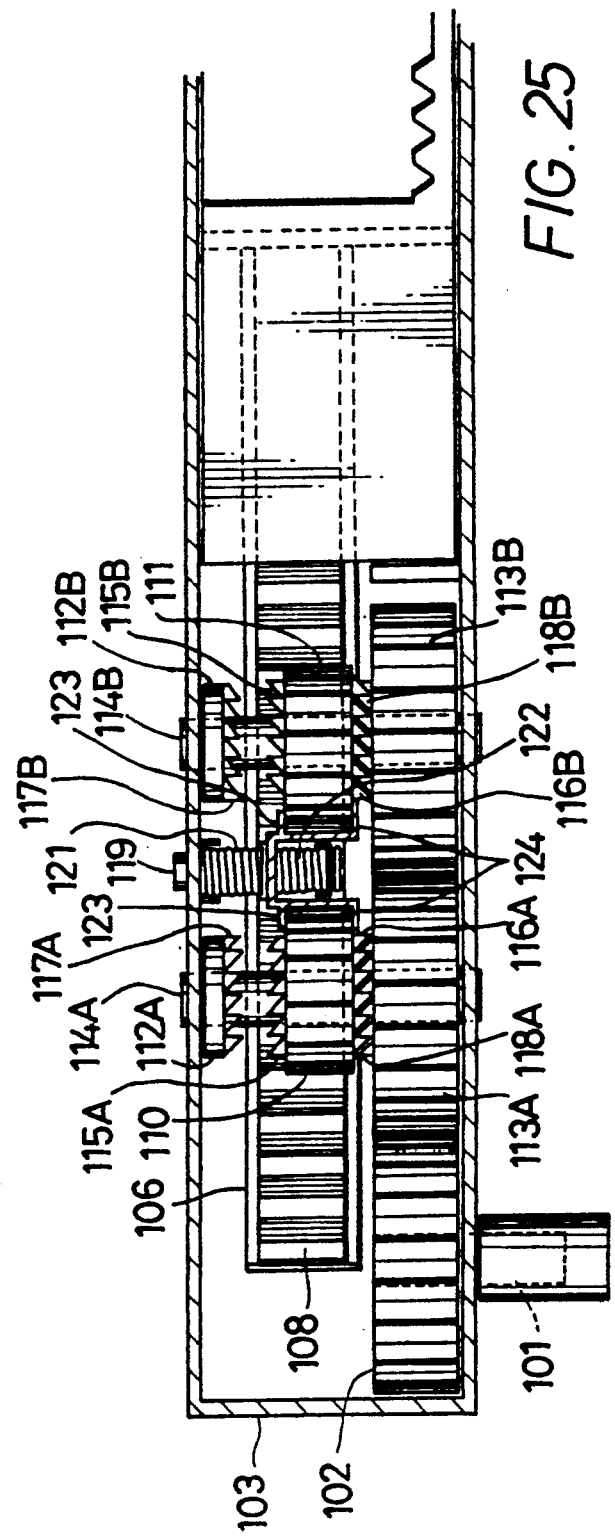

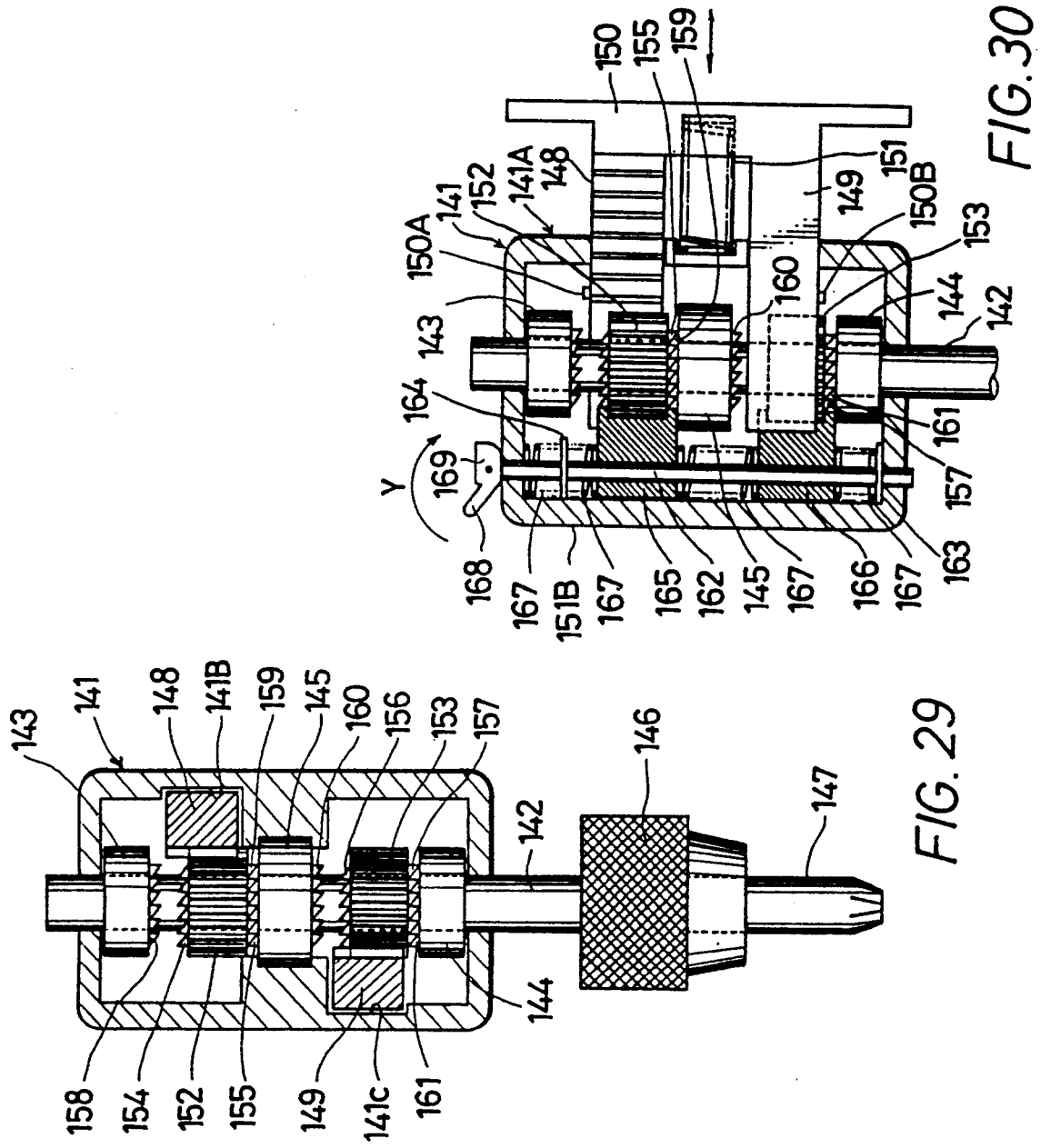

MOTION CONVERTING MECHANISM AND ROTARY TOOL

This is a divisional of copending application Ser. No. 07/690,916, filed Jun. 21, 1991, now U.S. Pat. No. 5,176,038.

TECHNICAL FIELD

The present invention relates to a mechanism for converting a rectilinear reciprocating motion into a rotary motion, and a rotary tool utilizing such a mechanism.

BACKGROUND ART

It is well known to provide a mechanism in which a combination of rack and pinion is used for converting a rectilinear motion of the rack into a rotary motion of the pinion. In such a mechanism, however, the pinion rotates in forward and reverse directions as the rack rectilinearly reciprocates. Thus, it has not been possible to obtain rotation in the same direction during both forward and reverse rectilinear movements of the rack.

For example, a conventional socket wrench includes an output shaft which is rotated in a certain direction by a ratchet mechanism. The socket wrench further includes a gear box in which the output shaft is housed and a lever projecting laterally from the gear box. After a socket for receiving a bolt or a nut is attached to the output shaft, the lever is manually turned. Only when the lever is turned in such a direction as to cause engagement of the ratchet mechanism, the output shaft is rotated by the turning force of the lever.

In such a socket wrench, the lever must be turned in a plane vertical to the output shaft of the lever. Therefore, if there is no space left for turning the lever, it is difficult to use the socket wrench. In some cases in which the space left for turning the lever is relatively small, the lever must be turned back before engagement of the ratchet mechanism advances a step. In such a case, the ratchet mechanism will not work, causing fastening or loosening operation of the bolt or the not to be practically impossible.

Another example may include a rotary tool, such as a screwdriver and a nut fastener, which can be operated through rotation of a shaft having a grip at one end thereof. The grip is grasped by a hand of a user and turned to rotate a driver tip element formed at the extreme end of the shaft or supported by a chuck attached to the extreme end of the shaft.

In such a rotary tool, it is necesarry to grasp and turn the grip by a hand. Thus, repetitive torsional action of the hand is required for turning the grip. This will reduce efficiency in operation, preventing fastening of many screws in a short period of time.

OBJECTS OF THE INVENTION

It is a primary object of the present invention to provide a motion converting mechanism utilizing a combination of rack and pinions wherein both forward and reverse movements of rectilinear reciprocating motion of the rack cause an output shaft to be rotated in the same direction.

It is another object of the present invention to provide a rotary tool utilizing such a motion converting mechanism.

DISCLOSURE OF THE INVENTION

In accordance with the present invention, there is provided a motion converting mechanism including a rack provided for rectilinear reciprocating motion; pinions engaged with the rack; an output shaft provided for rotary motion; and two one-way clutch mechanisms provided in the transmission path from the pinions to the output shaft. The first one-way clutch mechanism is adapted to rotate idly during forward movement of the rack, and the second one-way clutch mechanism is adapted to rotate during reverse movement of the rack. The transmission path from the two one-way clutch mechanisms to the output shaft is such that the output shaft may be rotated in the same direction when either of the two one-way clutch mechanisms is engaged. Thus, the output shaft is rotated in the same direction during both forward and reverse movements of the rack. Rotary tools utilizing this invention can convert a rectilinear reciprocating motion into a rotary motion in a certain direction, thereby improving the converting efficiency of motion.

One of the rotary tools embodying the present invention is a ratchet type socket wrench which utilizes the above motion converting mechanism. Specifically, the rotary tool includes an output shaft to which is attached a socket for receiving a bolt or a nut or the like; an output gear mounted on the output shaft; a gear box enclosing the output gear therein; a lever projecting laterally from the gear box; and a ratchet mechanism adapted to rotate the output gear only in a certain direction through manual operation of the lever for pivotal movement. A rod-like arm is slidably received in the lever, having a forward end extending in the gear box and a side surface or both side surfaces formed with rack teeth. The ratchet mechanism comprises a plurality of pinions engaged with the rack teeth and drive gears each coaxially disposed in layers with respect to a corresponding one of the pinions through two one-way clutches and adapted to transmit rotation of the pinion to the output gear. The first one-way clutch is adapted to rotate idly during forward movement of the arm, and the second one-way clutch is adapted to rotate idly during reverse movement of the arm, and the drive gears are operative to rotate the output gear in the same direction when either of the two one-way clutches is engaged. Thus, the rotary tool can fasten or loosen a bolt or a nut through turning of the lever. Reciprocating movement of the arm in the longitudinal direction of the lever also rotates the output shaft in a certain direction to permit fastening or loosening of a bolt or a nut. If there is no space left for turning the lever, a user may push and pull the arm for fastening or loosening of a bolt or a nut.

In accordance with another aspect of the present invention, the rotary tool includes a gear box having such a configuration as to be grasped by a hand of a user; an output shaft vertically extending through the gear box and rotatably supported thereby, the output shaft having a lower end projecting downwardly from the lower surface of the gear box and carrying a working member; two racks inserted through a side wall of the gear box at the upper and lower portions thereof and slidingly movable in and out of the gear box in a direction vertical to the side wall thereof; a grip connecting respective outer ends of the two racks and having such a configuration as to be grasped together with the gear box by the hand of the user; urging means for urging the grip in such a direction as to protrude the racks out of the gear box; a plurality of output gears enclosed in the gear box and mounted on the output shaft; two pinions loosely mounted on the output shaft and each engaged with a corresponding one of the two racks, and two one-way clutches provided between the output gears and the pinions. The first one-way clutch is associated with one of the two pinions and adapted to engage during forward movement of the racks, and the second one-way clutch is associated with the other of the two pinions and adapted to engage during reverse movement of the racks, and the pinions are operative to rotate the output gears in the same direction when either of the two one-way clutches is engaged. Thus, in the rotary tool, the racks are reciprocatingly moved through repeated grasp and release of the grip by the hand, and both the forward and reverse movements of the racks rotate the output shaft in the same direction. For example, when a conventional driver is used, a grip is turned in the direction of rotation of the output shaft. This operation is relatively inefficient. On the contrary, the rotary tool of the present invention can be operated through grasping the grip by the hand which assures improved efficiency in operation. Thus, the rotary tool provides rapid and ready fastening or loosening of a lot of screws or the like.

BRIEF DESCRIPTION OF THE DRAWINGS

in FIG. 3;

FIG. 11 is a plan view of a ratchet type socket wrench provided as an embodiment of the rotary tool according to the present invention;

FIG. 12 is a sectional view of FIG. 11 as viewed from the side;

FIG. 13 is a sectional view taken along line 13—13 in FIG. 12;

FIG. 14 is a sectional view taken along line 14—14 in FIG. 12;

FIG. 19 is a side view of an upper drive gear of the socket wrench in FIG. 11;

FIG. 20 is a side view of a pinion of the socket wrench in FIG. 11;

FIG. 21 is a side view of a lower drive gear of the socket wrench in FIG. 11;

FIG. 22 is a plan view of another embodiment of the socket wrench according to the present invention;

FIG. 23 is a side view of FIG. 22;

FIG. 24 is a cross sectional view of the front portion of FIG. 22;

FIG. 25 is a sectional view of FIG. 22 as viewed from the side;

FIG. 29 is a sectional view of a screwdriver according to a further embodiment of the present invention as viewed from the front;

FIG. 30 is a sectional view of the screwdriver in FIG. 29 as viewed from the side;

PREFERRED EMBODIMENTS

Figure 1:
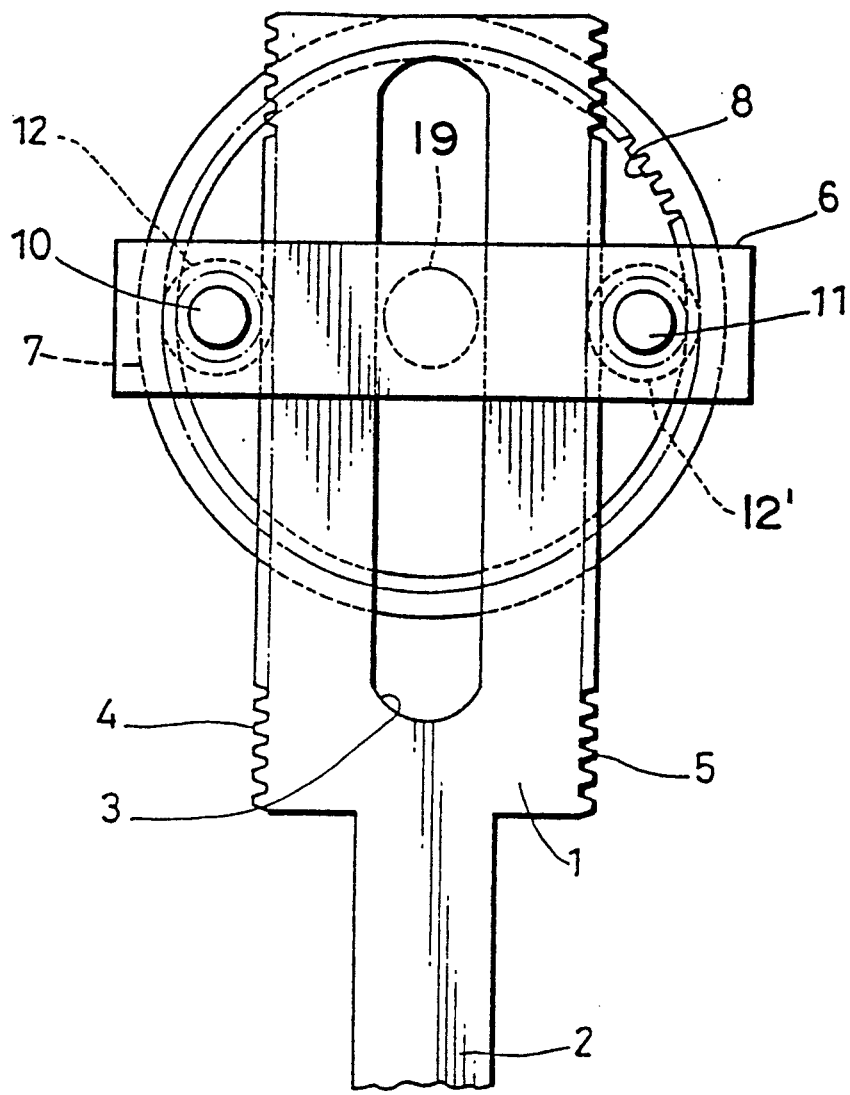
FIG. 1 is a plan view of an embodiment of the motion converting mechanism according to the present invention.

An embodiment of a motion converting mechanism will now be described with reference to FIG. 1 which is a plan view thereof and FIG. 2 which is a sectional view thereof.

The motion converting mechanism includes a rack 1 having opposite side surfaces formed with rack teeth 4, 5, a pair of pinions 12,12' engaged with the rack teeth 4, 5, respectively, drive gears 15,15' disposed coaxially with the pinions 12,12' respectively, a sun gear 7 having inner teeth engaged with the drive gears 15,15' an output shaft 19 serving as the rotary shaft of the sun gear 7, and one-way clutches 18,18' disposed between the pinions 12,12' and shafts 10, 11, respectively.

An input rod 2 extends from one end of the rack 1 and is driven for rectilinear reciprocating motion in the longitudinal direction manually or by means of a power supply. The rack teeth 4, 5 are formed in opposite longitudinal sides of the rack 1 extending parallel to the direction of the reciprocating motion. The rack 1 has a slit 3 longitudinally extending in the central portion thereof. An output shaft 19 loosely extends through the slit 3. The diameter of the output shaft 19 is equal to the width of the slit 3. The slit 3 and the output shaft 19 cooperate to restrict the direction of movement of the rack 1, permitting rectilinearly reciprocating motion of the rack 1 only in the longitudinal direction in which the slit 3 extends.

A stationary plate 6 is disposed on the rack 1 and extends above the output shaft 19 across the rack 1. The length of the stationary plate 6 is defined slightly greater than the diameter of the sun gear 7. The stationary plate 6 is fixed to a stationary structure such as a frame (not shown).

The shafts 10, 11 extend vertically and rotatably through the stationary plate 6 at opposite ends thereof. The shafts 10, 11 are integral with the drive gears 14, 15, serving as the rotary shafts thereof, respectively. The drive gears 14, 15' are in engagement with inner teeth 8 formed all around the inner periphery of the sun gear 7. The drive gears 14, 15' have lower surfaces slidably in contact with the bottom surface of the sun gear 7. Lubricating oil is applied between the lower surfaces of the drive gears 14, 15' and the bottom surface of the sun gear 7. The drive gears 14, 15' are not engaged with the rack teeth 4, 5.

The pinions 12, 12' are disposed between the stationary plate 6 and the drive gears 14, 15'. The pinions 12, 12' are rotatably mounted on the shafts 10, 11 through one-way clutches 18, 18' respectively. The pinions 12, 12' have upper surfaces slidably in cotact with the stationary plate 6. Lubricating oil is applied between the upper surfaces of the pinions 12, 12' and the stationary plate 6. Slip rings 16, 17 are provided between the pinions 12, 12' and the drive gears 15, 15' respectively. The pinions 12, 12' are in engagement with the rack teeth 4, 5 but are not engaged with the sun gear 7.

The one-way clutches 18, 18' serve to transmit rotation of the pinions 12, 12' only in a certain direction to the shafts 10, 11, respectively. The one-way clutches 18, 18' have the same allowable rotational direction. It is assumed in the following description that rotation of the pinions 12, 12' in the clockwise direction as seen in FIG. 1 causes engagement of the one-way clutches 18, 18'.

The motion converting mechanism operates as follows. When the input rod 2 is moved forward (upwardly as seen in FIG. 1), the pinions 12, 12' are rotated in the directions opposite to each other. Specifically, the left pinion 12 as seen in FIG. 1 is rotated in the counterclockwise direction, while the right pinion 12 is rotated in the clockwise direction. Consequently, the one-way clutch 19 provided on the right pinion 12 is engaged to transmit clockwise rotation of the pinion 12' to the shaft 11. Clockwise rotation of the shank 11 also causes clockwise rotation of the drive gear 15 which is integral with the shaft 11. The clockwise rotation of the drive gear 15, in turn, rotates the sun gear 7 in the clockwise direction. Thus, rotary motion in the clockwise direction is imparted to the output shaft 9.

Figure 2:
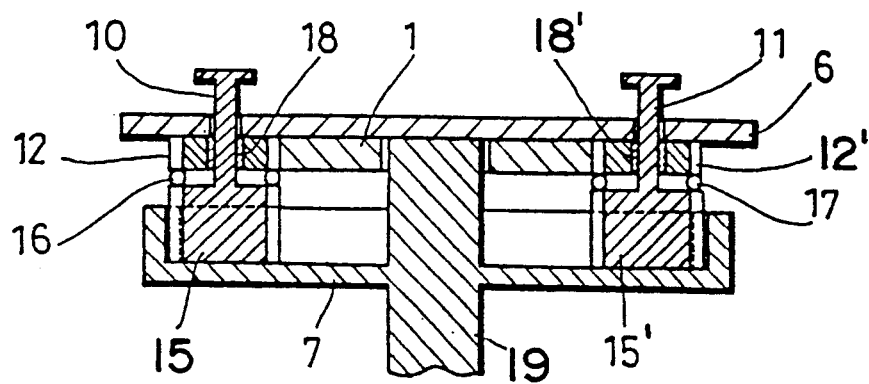
FIG. 2 is a sectional view of FIG. 1.

At this time, as the left pinion 12 as seen in FIG. 1 is rotated in the counterclockwise direction, the one-way clutch 18 is out of engagement, so that the pinion 12 idly rotates. Thus, the left drive gear 15 is left freely rotatable.

When the rack 1 moves in the reverse direction, the operation described above is inverted. Specifically, the left pinion 12 is rotated in the clockwise direction, while the right pinion 12' is rotated in the counterclockwise direction. Consequently, the left one-way clutch 18 is engaged, and the right one-way clutch 18' is disengaged. Clockwise rotation of the left pinion 12 is transmitted through the shaft 10 to the left drive gear 15, which also rotates the sun gear 7 in the clockwise direction. Thus, rotary motion in the same direction as that during the forward movement of the rack 1 is imparted to the output shaft 9. At this time, the right pinion 12' idly rotates and the right drive gear 15' is left freely rotatable.

As described above, reciprocating motion of the rack 1 permits the motion converting mechanism to generate rotary motion in the same direction during both forward and reverse movements thereof.

It will be understood that, if the allowable rotational direction of the one-way clutches 18, 18' is set to the opposite direction, available rotational direction is inverted.

The rack 1 may be formed in a rectangular frame which has two opposite sides formed with inner rack teeth 4, 5 which are engaged with the pinions 12, 12" disposed within the frame.

The sun gear 7 may have teeth 8 formed around the outer peripery thereof, so that the drive gears 15, 15' may be engaged with the outer periphery of the sun gear 7.

It will be also understood that similar operation is available by a rack having only one side formed with rack teeth with which two pinions are engaged through respective one-way clutches, one of which is engaged during forward movement of the rack and the other of which is engaged during reverse movement.

Figure 3:
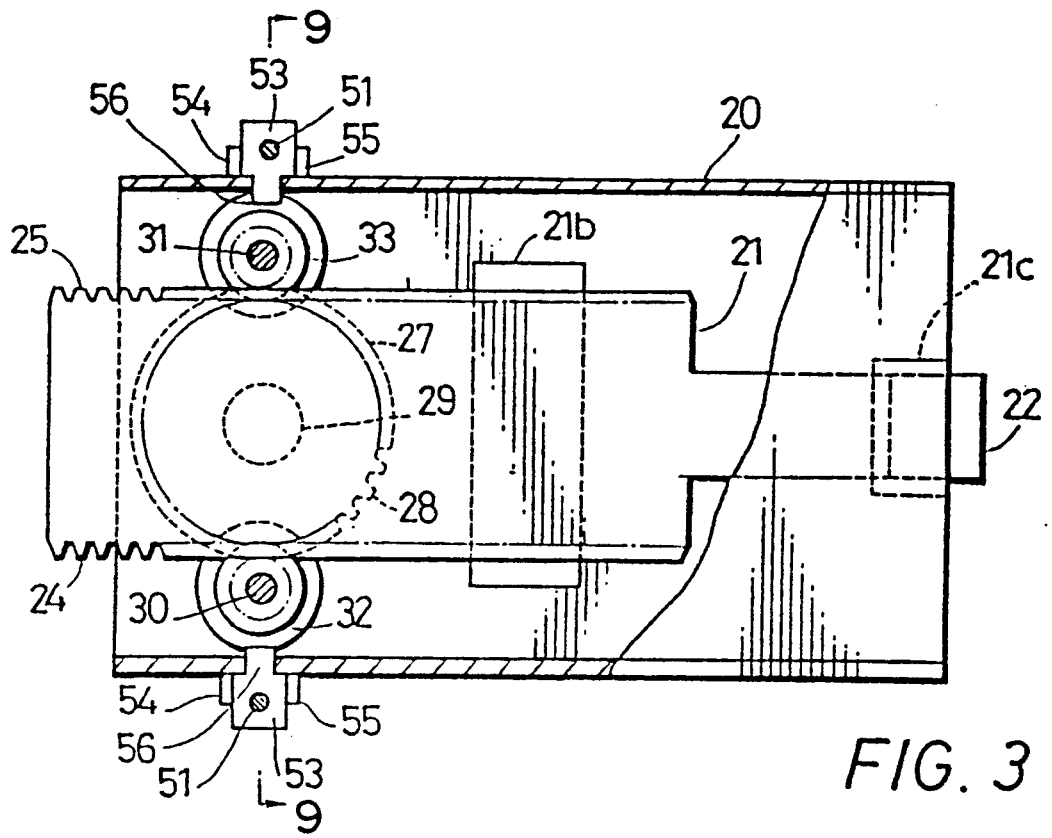
FIG. 3 is a plan view, partly broken away, of another embodiment of the motion converting mechanism.
Figure 4:
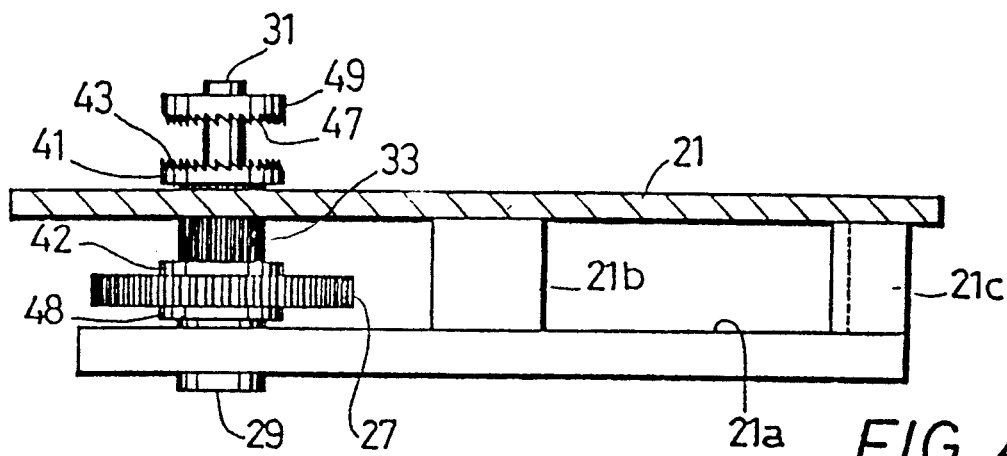
FIG. 4 is a vertical sectional view of FIG. 3.

Referring now to FIGS. 3 through 10, there is shown another embodiment of the motion converting mechanism of a different configuration from that of the above embodiment. FIG. 3 is a plan view and FIG. 4 is a vertical view thereof.

The motion converting mechanism includes a case 20 having both ends open, a rack 21 inserted through the case 20 for rectilinear reciprocating motion, a pair of pinions 32, 33 adapted to be engaged with rack teeth 24, 25 formed in opposite side surfaces of the rack 21, a sun gear 27 engaged with a pair of drive gears 34, 35 coaxially disposed below the pinions 32, 33, respectively, and an output shaft 29 serving as the rotary shaft of the sun gear 27 and adapted to output rotary motion.

As shown in FIG. 3, the rack 21 is formed with a pair of rack teeth 24, 25 extending parallel to longitudinal opposite sides thereof. An input rod 22 extends from one end of the rack 21 so as to input reciprocating motion. The input rod 22 is operated to input rectilinear reciprocating motion in the longitudinal direction (right-to-left direction as seen in FIG. 3) manually or by means of a power source. The rack 21 is slidably supported on stands 21b, 21c located on the bottom surface 21a of the case 20. The rack 21 is movable in parallel to the bottom surface 21a of the case 20.

Figure 5:
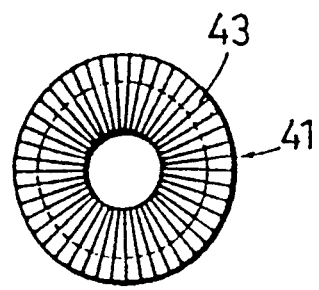
FIG. 5 is a plan view of clutch teeth of a one-way clutch mechanism.
Figure 6:
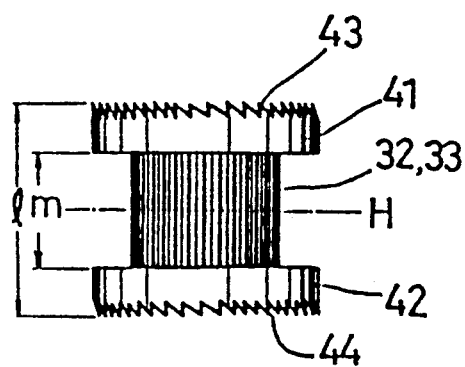
FIG. 6 is a side view of a pinion.

The pinions 32, 33 are loosely fitted on a pair of shafts 30, 31 located diametrically of the sun gear 27, respectively. The pinions 32, 33 are in engagement with the rack teeth 24, 25 but are not engaged with the sun gear 27. As shown in FIG. 6, each of the pinions 32, 33 is provided on the upper and lower surfaces thereof with integrally formed upper and lower flanges 41, 42. Radial clutch teeth 43, 44 are formed in the upper surface of the upper flange 41 and the lower surface of the lower flange 42, respectively. These clutch teeth 43, 44 are inclined in certain directions. Specifically, the inclinations of the upper and lower clutch teeth 43, 44 are point-symmetrical with respect to the centerline H of the pinion 32 or 33. The clutch teeth 43, 44 of the two pinions 32, 33 are of the same configuration. FIG. 5 is a plan view of the clutch teeth 43 formed in the upper flange 41.

Figure 9:
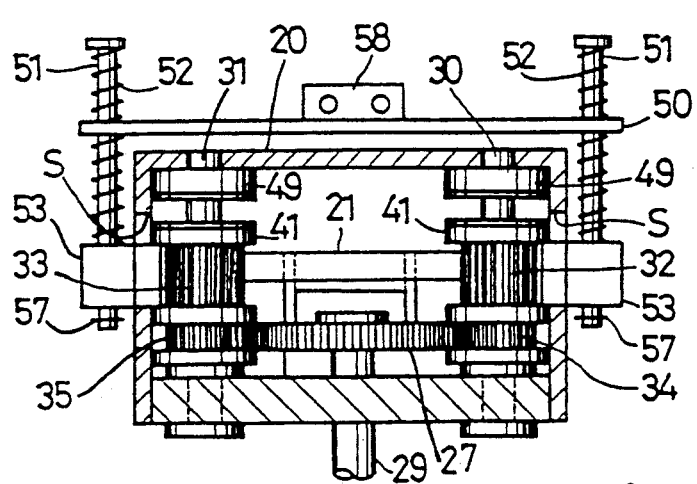
FIG. 9 is a sectional view taken along line 9—9.
Figure 10:
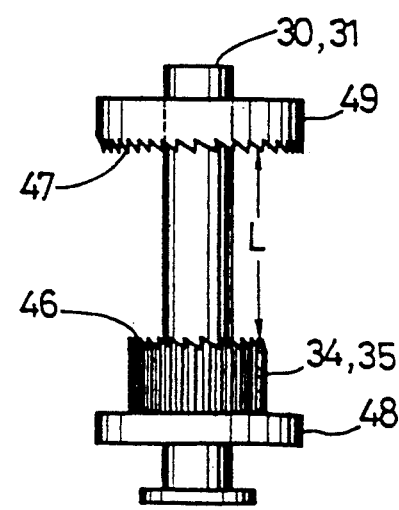
FIG. 10 is a front view of a drive gear.

As shown in FIG. 9, the shafts 30, 31 are rotatably supported by the upper and lower surfaces of the case 20. As shown in FIG. 10, the drive gears 34, 35 are fixedly secured to the lower portions of the shafts 30, 31, respectively. Each of the drive gears 34, 35 is provided on the lower surface thereof with a flange 48. Another flange 49 is provided in the upper portion of the shaft 30 or 31. The upper surface of each of the drive gears 34, 35 and the lower surface of the flange 49 have clutch teeth 46, 47 so configured as to be engageable with the clutch teeth 43, 44 of the pinions 32, 33, respectively. These clutch teeth 43, 44, 46, 47 serve to transmit rotary motion during rotation in a direction in which they are engaged, but they are disengaged during rotation in the opposite direction and cause idle rotation. Thus, these constitute a kind of one-way clutch mechanism which may be called "running face ratchet".

When the clutch teeth 44 of the pinions 32, 33 are in contact with the clutch teeth 46 of the drive gears 34, 35, respectively, rotation of the pinions 32, 33 in the counterclockwise direction as seen in FIG. 3 causes engagement of the clutch teeth 44 and 46, so that rotation may be transmitted. During clockwise rotation, the pinions 32, 33 idly rotate. On the contrary, when the clutch teeth 43 of the pinions 43, 44 are in contact with the clutch teeth 47 of the flange 49, rotation of the pinions 32, 33 in the clockwise direction as seen in FIG. 3 causes engagement of the clutch teeth 43 and 47, so that rotation may be transmitted. During counterclockwise rotation, the pinions 32, 33 idly rotate. It will be understood that, if all of the clutch teeth 43, 44, 46, 47 are inclined in the directions opposite to those shown in FIGS. 8 and 10, the above described operation will be completely inverted.

The distance L between the upper surface of each of the drive gears 34, 35 and the lower surface of the corresponding upper flanges 49 is defined greater than the total height l of each of the pinions 32, 33 and the flanges 41, 42). The height m of each of the pinions 32, 33 is set to be greater than the difference between the distance L and the total height l (L-l).

The drive gears 34, 35 are engaged with the sun gear 27 at diametrically symmetrical positions with respect to the output shaft 29. But, the drive gears 34, 35 are not engaged with the rack teeth 24, 25.

Figure 7:
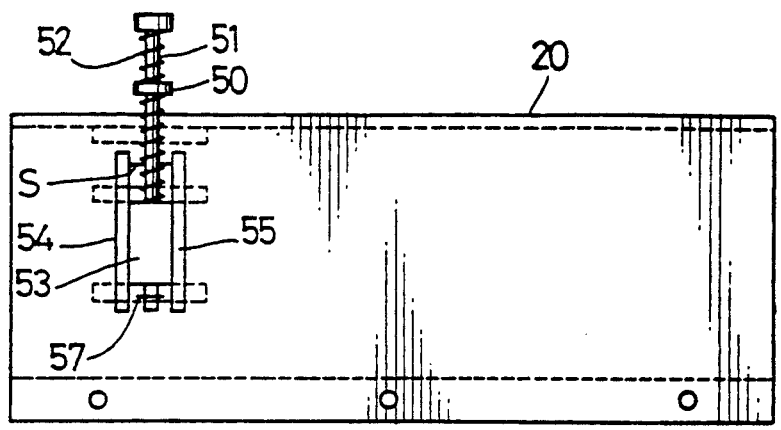
FIG. 7 is a side view of the whole structure.
Figure 8:
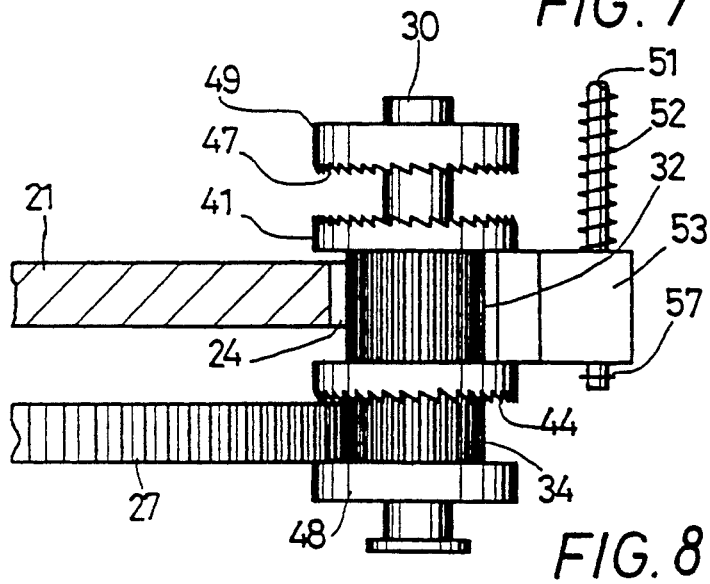
FIG. 8 is an enlarged side view showing engagement between the rack and pinion.

The case 20 is formed in both side walls thereof with identical vertical slits S laterally outside of the respective pinions 32, 33. On both sides of the case a slider 53 having a T-shaped section is vertically movably fitted in each of the slits S. The slider 53 has a projection 56 extending inwardly to be loosely received between the upper and lower flanges 41, 42 of the pinion 32 or 33. The innermost end of the projection 56 is out of contact with the teeth of the pinion 32 or 33. A pin 51 is vertically inserted through the slider 53. The pin 51 is loosely encircled by a spring 52 for urging the slider 53 downwardly. The pin 51 is provided at the lower end thereof with a stopper 57 for preventing falling out of the slider 53. A connecting plate 50 is provided above the case 20, extending transversely thereof to connect the upper portions of the pins 51 on both sides of the case 20. A lug 58 is fixed to the central portion of the upper surface of the connecting plate 50. As shown in FIG. 7, a pair of guide plates 54, 55 are provided on both sides of the slit S, projecting so as to guide the slider 53 therebetween.

The motion convering mechanism of this embodiment operates as follows. First, the description will be given as to the forward movement of the rack 21 (movement in the left direction as seen in FIG. 3) with the sliders 53 urged by the springs 52 to the lowered position. This condition is shown in FIG. 9, the elements in a half portion of which are shown in an enlarged scale in FIG. 8.

As the rack 21 is moved forwardly, both pinions 32, 33 are rotated. At this time, the lower pinion 32 as seen in FIG. 3 is rotated in the counterclockwise direction, and the upper pinion 33 is rotated in the clockwise direction. Thus, rotation of the lower pinion 32 is transmitted to the drive gear 34, which is rotated in the counterclockwise direction. This causes the sun gear 27 to be rotated in the clockwise direction as seen in FIG. 3, so that the output shaft 29 is also rotated in the same direction as the sun gear 27. At this time, as the upper pinion 33 idly rotates, the drive gear coaxially disposed therewith is left freely rotatable. When the clutch teeth 46 of the drive gear 35 ride across the clutch teeth 44 of the pinion, the slider 53 is pushed upward. As the spring 52 has such a biasing force as to allow upward movement of the slider 53, the pinion 33 idly rotates.

As the rack 21 is moved reversely, the pinions 32, 33 rotate in the respective directions opposite to those during the forward movement. Thus, the counterclockwise rotation of the upper pinion 33 as seen in FIG. 3 is transmitted to the drive gear 35. This causes the sun gear 27 to be rotated also in the clockwise direction as seen in FIG. 3, and the output shaft 29 is rotated in the same direction as the sun gear 27.

As described above, when the sliders 53 are at their lowered position, the output shaft 29 is rotated in the clockwise direction as seen in FIG. 3 during both forward and reverse movements of the rack 21.

Now, the description will be given as to the operation when the lug 58 is pulled up to bring the flanges 41 of the upper surfaces of the pinions 32, 33 into contact with the upper flanges 49 mounted on the shafts 30, 31, respectively.

With this condition, rotation of the pinions 32, 33 in the clockwise direction as seen in FIG. 3 causes engagement between the clutch teeth 43 and 49 and therefore transmission of rotation. The clockwise rotation causes the drive gears 34, 35 to rotate in the clockwise rotation through the shafts 30, 31, respectively. Thus, the sun gear 27 is rotated in the counterclockwise direction as seen in FIG. 3, so that the output shaft 29 generats rotary motion in the same direction as the sun gear 27. As the result, the output shaft 29 is rotated in the counterclockwise direction during both forward and reverse movements of the rack 21. The lug 58 is raised to such a level as to bring the clutch teeth 43 and 47 in contact with one another. Specifically, the connecting plate 50 is raised to such a position that the resilient force of the spring 52 may operate to allow the clutch teeth 43 to ride across the clutch teeth 49 during idle rotation of the pinions 32, 33.

As described above, the motion converting mechanism of this embodiment, like the one illustrated in FIG. 1, can output rotary motion in the same direction during both forward and reverse movements of the rack 21. Additionally, the rotational direction of the output shaft 29 can be changed by raising the lug 58.

It will be understood that, in this embodiment, like the one illustrated in FIG. 1, the positional relationship between the rack teeth 24, 25 and the pinions 32, 33 and the positional relationship between the sun gear 27 and the drive gears 34, 35 may be inverted, or the rack 21 may have only one side formed with rack teeth.

Though, in the above two embodiments, the transmission mechanism from the pinions 12, 12'or 32, 33 to the output shafts 19, 29 is constituted by the one-way clutch mechanism, the drive gears 15, 15', or 34, 35 and the sun gear 7 or 27, the present invention is not limited to the particular structure, and in this connection, intermediate transmission gears may be added, or pulleys and belts may be employed for transmission.

As described above, the motion converting mechanism in accordance with the present invention is widely applicable to provide rotary motion in a certain direction. The present invention can be utilized in any components which require rotary power, such as of aircrafts, ships, railroads, automobiles, bicycles, construction (building) equipment, heavy machines, general machines, generators, motors, tools, business machines and medical instruments.

Some embodiments of rotary tools utilizing the motion converting mechanism of the present invention will now be described.

FIG. 11 is a plan view of a first embodiment of the rotary tool, and FIG. 12 is a side view thereof. This rotary tool is a ratchet type socket wrench. The rotary tool includes an output shaft 61 to which can be attached a socket (not shown) for receiving a bolt or a nut or the like, an output gear 62 mounted on the output shaft 61, a gear box 63 in which the output gear 62 is housed and a lever 64 extending laterally from a side of the gear box 63.

As shown in FIG. 13 which is a sectional view taken along line 13—13 in FIG. 12, the lever 64 has an upwardly open U-shaped section. As shown in FIG. 14, the lever 64 encloses an arm body 65 in the form of a square rod and a rack 66 connected to the front portion (the left portion as seen in FIG. 12) of the arm body 65 through a pin 67, both members being longitudinally slidable within the lever 64.

Figure 15:
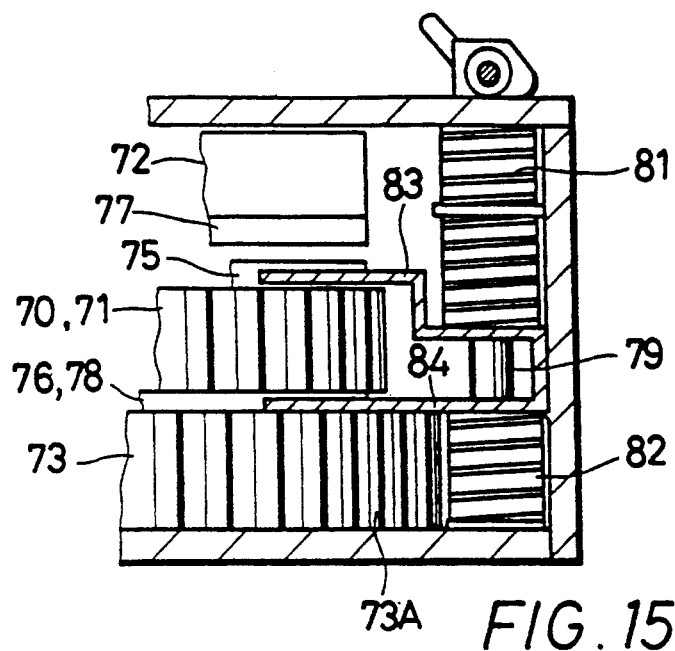
FIG. 15 is an enlarged sectional view showing pinion supporting plates and related elements of the socket wrench in FIG. 11.

The rack 66 has opposite side surfaces formed with a pair of rack teeth 68, 69, and a forward end positioned within the gear box 63. Two pinions are provided within the gear box 63, each being disposed on either side of the rack 66 in engagement with the corresponding rack teeth 68, 69. As shown in FIG. 15, each of the pinions 70, 71 is disposed between an upper drive gear 72 and a lower drive gear 73 all of which are coaxially arranged in layers. The upper and lower drive gears 72, 73 are connected by a connecting rod 74 to be rotated a unit. Each of the pinions 70, 71 is loosely fitted on the connecting rod 74.

The distance between each of the upper drive gears 72 and the corresponding lower drive gear 73 is greater than the height of each of the pinions 70, 71. The upper drive gear 72 has a smooth side surface, while the side surface of the lower drive gear 73 is formed with teeth 73A which are engaged with the output gear 62.

As shown in FIG. 20, each of the pinions 70, 71 has upper and lower surfaces formed with a plurality of wedge-shaped clutch teeth 75, 76 arranged in rings. The inclination of the clutch teeth 75 is opposite to that of the clutch teeth 76. As shown in FIG. 19, the upper drive gear 72 has a lower surface formed with clutch teeth 77 which are so configured as to be engaged with the clutch teeth 75 of the upper surface of the pinion 70 or 71, and similarly the lower drive gear 73 has an upper surface formed with clutch teeth 78 which are so configured as to be engaged with the clutch teeth 76 of the lower surface of the pinion 70 or 71. These clutch teeth 75, 76, 77, 78 serve to transmit rotary motion during rotation in a direction in which they are engaged, but they ride across the corresponding inclined surfaces during rotation in the opposite direction and cause idle roation, thus constituting a kind of one-way clutch mechanism which may be called "running face ratchet".

Figure 17:
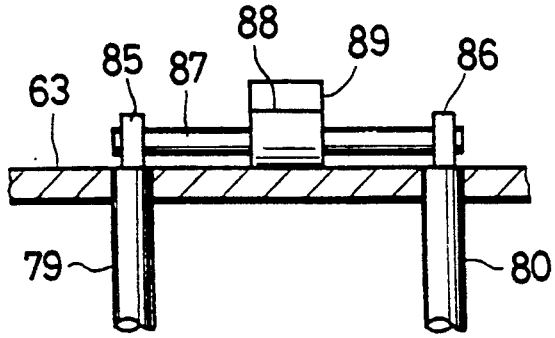
FIG. 17 is a sectional view showing connection between a cam member and a post of the socket wrench in FIG. 11.
Figure 18:
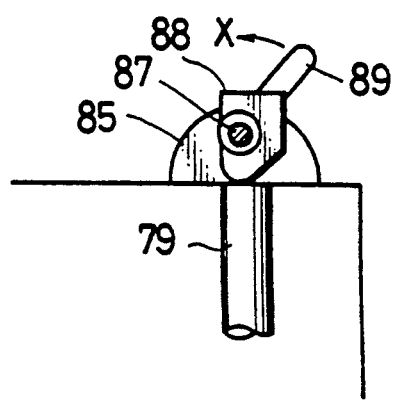
FIG. 18 is a side view of FIG. 17.

A pair of posts are provided behind the pinions 70, 71 and extend vertically in parallel to the output shaft 61. Two gear support plates 83, 84 parallel to each other are fixedly fitted at respective ends thereof on the central portion of each of the posts 79, 80. Springs 81 and 82 are provided encircling a portion of each of the posts 79 and 80 above the gear support plate 83 and a portion below the gear support plate 84, respectively, so as to urge the gear support plates 83, 84 toward the central portion of the post 79 or 80. As shown in FIG. 17, the upper ends of the posts 79, 80 extend through the upper surface of the gear box 63 and are connected with semicircular bearings 85, 86, respectively, as shown in FIG. 18. A bar 87 extends between the bearings 85, 86. A cam member 88 is attached to the central portion of the bar 87. The cam member 88 is provided with a handle 89 projecting upwardly therefrom. When the handle 89 is raised to rotate the cam member 88 to the position shown in FIG. 18, the bar 87 is lifted, and consequently the posts 79, 80 are pulled upwardly. In this condition, as the gear support plates 83, 84 fixed to the posts 79, 80 are raised, the pinions 70, 71 are also raised by the gear support plates 83, 84. This causes the clutch teeth 75 of the upper surfaces of the pinions 70, 71 to be engaged with the clutch teeth 77 of the upper drive gear 72.

On the contrary, when the handle 89 is turned in the direction shown by an arrow X, the level of the bar 87 is lowered, so that the posts 79, 80 are moved downwardly. Thus, the gear support plates 83, 84 are also lowered, causing the clutch teeth 76 of the lower surfaces of the pinions 70, 71 to be engaged with the clutch teeth 78 of the lower drive gear 73.

Figure 16:
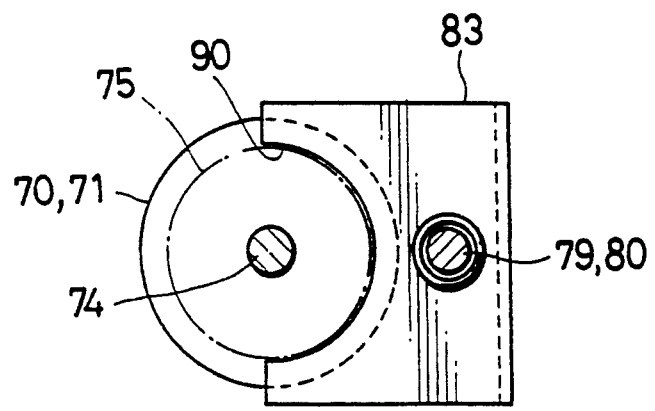
FIG. 16 is a plan view of the pinion supporting plate.

As shown in FIG. 16, the gear support plates 83, 84 are formed with respective arcuate cutout portions 90. The cutout portions 90 are defined around the outer peripheral ends of the clutch teeth 75, 76 of each of the pinions 70, 71. Thus, each of the pinions 70, 71 is held at the outer peripheral edge thereof between the cutout portions 90 of the gear support plates 83, 84 with the clutch teeth 75, 76 held out of contact with the gear support plates 83, 84.

Referring again to FIGS. 11 and 12, an inverted U-shaped grip cover 91 is secured to the upper surface of the arm body 65 by screws 92, 94 in such a manner as to cover the upper surface of the arm body 65 and both sides of the lever 64, as shown in FIG. 14. As the grip cover 91 is grasped by a hand of a user and moved front to back, the arm body 65 and the rack 66 are also moved front to back.

The arm body 65 is formed at the front end thereof with vertically aligned teeth 94, and the lever 64 is formed at the inner bottom surface thereof with rack teeth 95 engageable with the teeth 94. When the arm body 65 is received in the lever 64, the teeth 94 are out of engagement with the rack teeth 95, and when the arm body 65 is pivotally moved in the direction shown by an arrow M in FIG. 12, the teeth 94 are brought in engagement with the rack teeth 95.

A cover plate 96 extends from the upper surface of the gear box 63 over the upper surface of the rack 66 so as to prevent upward protrusion of the rack 66 as well as to restrict forward travel of the grip cover 91.

The socket wrench of this embodiment operates as follows. The description will be first given as to fastening or loosening of a bolt and nut by pivoting the lever 64 in the rotational direction of the output shaft 61 in the same manner as a conventional socket wrench. In this case, a suitable socket (not shown) is attached to the output shaft 61 and then the lever 64 is pivoted in the direction shown by an arrow L in FIG. 11 that is, in the rotational direction of the output shaft 61. The output gear 62 is rotated along with the lever 64 during rotation only in a certain direction, while it idly rotates during rotation in the opposite direction. Thus, the rotary tool can be operated to fasten or loosen a bolt or a nut by reciprocating pivotal movement of the lever in the direction L which causes the output shaft 61 to be rotated only in a certain direction.

If it is difficult for the lever 64 to be pivotally moved because of no space left for such pivotal movement of the lever 64, the output shaft 61 can be also rotated in a certain direction by push and pull operation of the arm body 65. In this embodiment, the grip cover 91 is grasped by a hand of a user to be pushed and pulled front to back.

Now, it is assumed that the handle 89 of the cam member 88 is at its forwardly pivoted position and the clutch teeth 76 of the lower surfaces of the pinions 70, 71 are engaged with the clutch teeth 78 of the upper surfaces of the lower drive gears 73, respectively. When the arm body 65 is pushed forwardly in this condition, the rack 66 is also moved forwardly because of the connection therebetween by the pin 67. This causes the pinions 70, 71 in engagement with the rack teeth 68, 69 to be rotated in the directions opposite to each other.

At this time, the clutch teeth 76 of one of the pinions 70, 71 (here 71 is taken for illustration) is engaged with the clutch teeth 78 of the corresponding lower drive gear 73, but the other pinion 70 idly rotates. Thus, rotation of the clutch 71 in engagement is transmitted to the corresponding lower drive gear 73, which in turn rotates the output gear 62 in a predetermined direction. Specifically, as the rack teeth 68 is moved forwardly, the pinion 71 is rotated in the counterclockwise direction as seen in FIG. 11, and such rotation causes the corresponding lower drive gear 73 (which is positioned under the pinion 71 and not shown in FIG. 11) to be rotated in the counterclockwise direction. This rotation of the lower drive gear 73 also rotates the output gear 62 in the clockwise direction.

When the arm body 65 is pulled backwardly, the rack 66 is moved backwardly. This causes the pinions 70, 71 in engagement with the rack teeth 68, 69 to be rotated in the directions opposite to each other (respective rotational directions are inverted in relation to those during the forward movement of the arm body 65).

In this case, the clutch teeth 76 of the pinion 70 is engaged with the clutch teeth 78 of the corresponding lower drive gear 73, but the other pinion 71 idly rotates. Thus, rotation of the pinion 70 in engagement is transmitted to the corresponding lower drive gear 73, which in turn rotates the output gear 62 in a predetermined direction. Specifically, as the rack teeth 69 is moved backwardly, the pinion 70 is rotated in the counterclockwise direction as seen in FIG. 11, and such rotation causes the corresponding lower drive gear 73 (which is positioned under the pinion 71 and not shown in FIG. 11) to be rotated in the clockwise direction. This rotation of the lower drive gear 73 also rotates the output gear 62 in the clockwise direction.

Thus, in this embodiment, rotation of the pinions 70, 71 is transmitted to one of the lower drive gears 73 during forward movement of the arm body 65 and it is transmitted to the other lower drive gear 73 during reverse movement thereof so as to rotate the output gear 62 in a certain direction.

When it is desired to change the rotational direction of the output gear 62, the handle 89 of the cam member 88 is turned backwardly, which causes the clutch teeth 75 of the upper surfaces of the pinions 70, 71 to be engaged with the clutch teeth 77 of the lower surfaces of the upper drive gear 72.

When the arm body 65 is moved forwardly, the clutch teeth 75 of the upper pinion 70 as seen in FIG. 11 is engaged with the clutch teeth 77 of the corresponding upper drive gear 72, so that the upper drive gear 72 is rotated in the clockwise direction. Consequently, the output gear 62 is rotated in the counterclockwise direction. When the arm body 65 is moved backwardly, the clutch teeth 75 of the lower pinion 71 as seen in FIG. 11 is engaged with the clutch teeth 77 of the corresponding upper drive gear 72, so that the upper drive gear 72 is rotated in the clockwise direction. Consequently, the output gear 62 is rotated also in the counterclockwise direction.

Thus, the rotational direction of the output shaft 61 can be changed by pivotally operating the handle 89 of the cam member 88 for fastening and loosening of a bolt or a nut.

When it is desired to obtain stronger fastening torque at the end of fastening operation of a bolt or a nut, the user may execute the following process.

Specifically, the arm body 65 is pivotally movable in the vertical direction, as shown in FIG. 12. When the arm body 65 is pivoted upwardly, the teeth 94 at the front end of the arm body 65 are brought in engagement with the rack teeth 95 of the lever 64. In this condition, further upward pivotal movement of the arm body 65 causes the teeth 94 to be rotated in the counterclockwise direction as seen in FIG. 12, so that the pin 67 is moved forwardly. Thus, the rack 66 is moved forwardly by stronger force. Consequently, the output shaft 61 can generate stronger torque.

The description will be given as to a second embodiment of the rotary tool of the present invention with reference to FIG. 22 which is a plan view of the rotary tool, FIG. 23 which is a side view thereof, and FIGS. 24 and 25 which are enlarged sectional views of a gear box 103.

Though the pinions 70, 71 shown in FIG. 11 are disposed on opposite sides of the rack 66, the rotary tool of this embodiment has pinions disposed on one side of a rack 106 so that the width of the gear box 43 may be reduced.

The rotary tool of this embodiment includes an output shaft 101 to which can be attached a socket (not shown) for receiving a bolt or a nut or the like, an output gear 102 mounted on the output shaft 101, a gear box 103 in which the output gear 102 is enclosed, and a lever 104 extending from a side of the gear box 103 (which is, in this embodiment, designed to slidably receive the front portion of an arm body 105).

As shown in FIG. 22, the lever 104 encloses an arm body 105 in the form of a square rod and a rack 106 connected through a pin 107 (FIG. 23) to the front portion (the left portion as seen in FIG. 22) of the arm body 105, both members being slidingly movable in the longitudinal direction within the lever 104.

The rack 106 is offset to extend into the gear box 103 along an inner side wall thereof. The rack 106 has an inner side surface formed with rack teeth 108.

Two pinions 110, 111 are disposed within the gear box 103 in engagement with the rack teeth 108 and aligned longitudinally of the rack 106 along the side thereof. Above and below the pinions 110, 111, upper drive gears 112A, 112B and lower drive gears 113A, 113B are coaxially arranged in layers, respectively, as shown in FIG. 25. The upper drive gears 112A, 112B and the lower drive gears 113A, 113B are connected to each other by connecting rods 114A, 114B to be rotated together as a unit, respectively. The pinions 110, 111 are loosely fitted on the connecting rods 114A, 114B, respectively.

The distance between each of the upper drive gears 112A, 112B and the corresponding lower drive gear 113A or 113B is defined greater than the height of each of the pinions 110, 111. The upper drive gears 112A, 112B have smooth side walls, while the lower drive gears 113A, 113B have side walls formed with teeth, the teeth of the lower drive gear 113A being in engagement with the teeth of the output gear 102 and also with the teeth of the other lower drive gear 113B. The teeth of the other lower drive gear 113B are not engaged with the output gear 102.

As shown in FIG. 25, the pinions 110, 111 have upper and lower surfaces formed with a plurality of wedge-shaped teeth 115A, 115B and 116A, 116B arranged in rings, respectively. The inclination of these cluth teeth 115A, 115B is opposite to that of the clutch teeth 116A, 116B. As shown in FIG. 25, the upper drive gears 112A, 112B have lower surfaces formed with clutch teeth 117A, 117B which are so configured as to be engaged with the clutch teeth 115A, 115B of the upper surfaces of the pinions 110, 111, respectively. Similarly, the lower drive gears 113A, 113B have upper surfaces formed with clutch teeth 118A, 118B which are so configured as to be engaged with the clutch teeth 116A, 116B of the lower surfaces of the pinions 110, 111, respectively. These clutch teeth 115A through 118B serve to transmit rotary motion during rotation in a direction in which they are engaged, but they ride across corresponding inclined surfaces during rotation in the opposite direction and cause idle rotation, thus constituting a kind of one-way clutch mechanism which may be called "running face ratchet".

Figure 26:
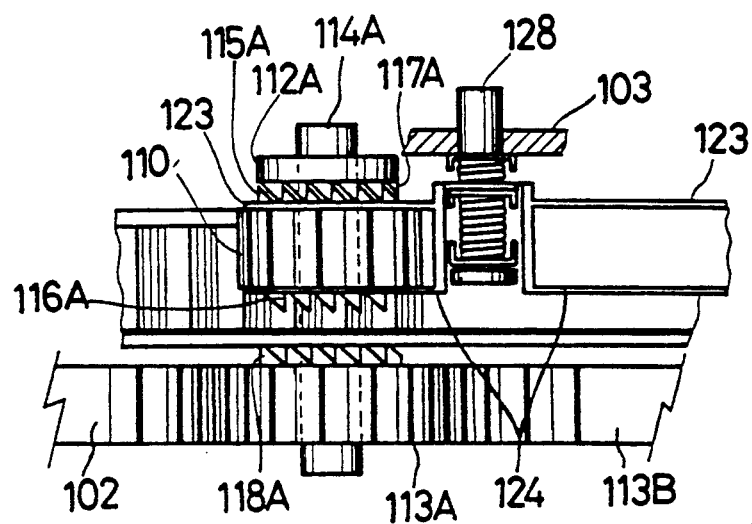
FIG. 26 is a side view showing elements around a pinion and upper and lower drive gears of the socket wrench in FIG. 22.
Figure 27:
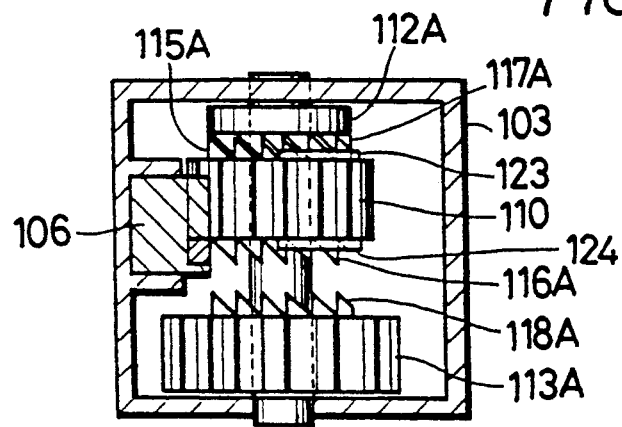
FIG. 27 is a view showing the arrangement of FIG. 26 as viewed from the front.
Figure 28:
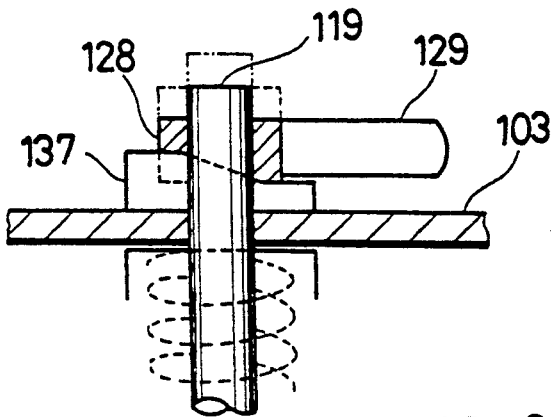
FIG. 28 is a side view of a rotary cam and a lever of the socket wrench in FIG. 22.

A post 119 is provided between the pinions 110, 111 and extends in parallel to the output shaft 101. Two gear support plates 123, 124 parallel to each other are fixedly fitted at respective ends thereof on the central portion of the post 119. Springs 121, 122 are provided encircling a portion of the post 119 above the gear support plate 123 and a portion below the gear support plate 124, respectively, so as to urge the gear support plates 123, 124 toward the central portion of the post 119. The upper end of the post 119 projects from the upper surface of the bear box 103 and is fixedly connected to a rotary cam member 128 rotatably placed on a pedestal 137 having a cam surface, as shown in FIG. 28. The cam member 128 is provided with a handle 129 projecting laterally from a side thereof. When the handle 129 is pivotally moved to rotate the rotary cam member 128 to a position resting on the cam surface of the pedestal 137, the post 119 is pulled upwardly, and consequently the gear support plates 123, 124 fixed to the post 119 are raised, and the pinions 110, 111 are also raised by the gear support plates 123, 124. This causes the clutch teeth 115A, 115B of the upper surfaces of the pinions 110, 111 to be engaged with the clutch teeth 117A, 117B of the upper drive gears 112A, 112B, respectively. FIG. 26 is a partial side view showing the condition in which the pinions 110, 111 are lifted, and FIG. 27 illustrates the condition as seen from the front.

When the handle 129 is turned to move the rotary cam member 128 downwardly, the post 119 is also moved downwardly. Thus, the gear support plates 123, 124 are also lowered, causing the clutch teeth 116A, 116B of the lower surfaces of the pinions 110, 111 to be engaged with the clutch teeth 118A, 118B of the lower drive gears 113A, 113B, respectively.

The gear support plates 123, 124 are formed with respective arcuate cutout portions (not shown) like the ones shown in FIG. 16. Referring again to FIG. 23, the arm body 105 is formed at the front end thereof with vertically aligned teeth 134, and the lever 104 is formed at the inner bottom surface thereof with rack teeth 135 engageable with the teeth 134. When the arm body 105 is received in the lever 104, the teeth 134 are out of engagement with the rack teeth 135, and when the arm body 105 is pivotally moved upwardly, the teeth 134 are brought in engagement with the rack teeth 135.

The operation of this embodiment is similar to that of the rotary tool shown in FIG. 11. In this case, however, when rotation of the rear pinion 111 is transmitted to the lower drive gear 113B, the rotation of the lower drive gear 113B rotates the other lower drive gear 113A through which the output gear 102 is rotated.

Figure 31:
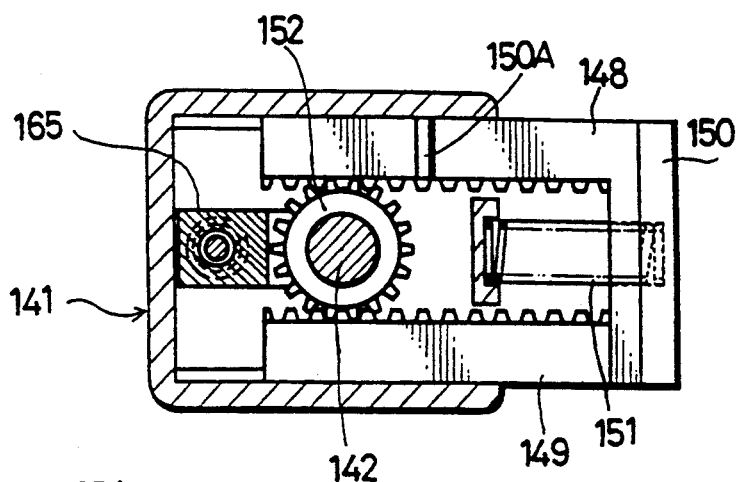
FIG. 31 is a cross sectional view of the screwdriver in FIG. 29.

Now, the description will be given as to a third embodiment of the rotary tool in accordance with the present invention. FIG. 29 is a sectional view of the rotary tool viewed from the front, FIG. 30 is a sectional view as seen from the side, and FIG. 31 is a cross sectional view thereof.

The rotary tool includes a gear box 141 in the form of a substantially rectangular box having such a dimension and configuration as to be grasped by a hand of a user. An output shaft 142 in the form of a straight rod extends vertically through the gear box 141. Upper and lower output gears 143, 144 are provided and are mounted to the uppermost and lowermost positions of the output shaft 142 within the gear box 141, respectively. These output gears 143, 144 serve to prevent falling out of the output shaft 142, and thus the output shaft 142 is rotatably supported by the gear box 142. The output shaft 142 has a lower end straightly projecting downwardly from the lower surface of the gear box 141. A chuck 146 is fixed to the extreme end of the output shaft 142 and is used to detachably attach an exchangeable tip, such as a plus screwdriver tip 147, a minus screwdriver tip (not shown) and a nut fastener tip (not shown), to the rotary tool.

Two racks 148, 149 are inserted through a side wall 141A of the gear box 141 at the upper and lower portions thereof and movable in and out of the gear box 141 in the direction vertical to the side wall 141A thereof. The racks 148, 149 are connected at respective outer ends thereof by a grip 150 which is a plate-like member extending in parallel to the side wall 141A. The grip 150 has such a configuration as to be grasped together with the gear box 141 by a hand of a user. The racks 148, 149 are slidably fitted in guides 141B, 141C formed as grooves in the opposite inner surfaces of the right and left side walls of the gear box 141. The racks 148, 149 are formed with teeth in respective side surfaces opposite to each other, with the output shaft 142 disposed therebetween.

A spring 151 is provided between the central portion of the inside of the grip 150 and the side wall 141A of the gear box 141 and is adapted to urge the grip 150 apart from the side wall 141A of the gear box 141, that is, in such a direction as to protrude the racks 148, 149 outwardly. Stoppers 150A and 150B are provided projecting respectively from the upper surface of the rack 148 and the lower surface of the rack 149 in the transverse direction thereof so as to prevent falling out of the racks 148, 149.

In addition to the upper and lower output gears 143, 144, and intermediate output gear 145 is provided within the gear box 141 and is mounted on the output shaft 142 between the output gears 143 and 144. A pinion 152 is disposed between the upper output gear 143 and the intermediate output gear 145 and is engaged with the upper rack 148, and another pinion 153 is disposed between the intermediate output gear 145 and the lower output gear 144 and is engaged with the lower rack 149, both of the pinions 152, 153 being loosely mounted on the output shaft 142.

The pinion 152 has upper and lower surfaces formed with a plurality of wedge-shaped teeth 154, 155, respectively, arranged in rings, and similarly the pinion 153 has upper and lower surfaces formed with a plurality of wedge-shaped clutch teeth 156, 157, respectively, also arranged in rings. The upper and lower clutch teeth 154, 155 of the pinion 152 are oppositely inclined relative to each other, and the upper and lower clutch teeth 156, 157 of the other pinion 153 are also oppositely inclined relative to each other. As to the two pinions 152, 153, both of the respective upper clutch teeth 154 and 156 are inclined in one direction, and both of the respective lower clutch teeth 155 and 157 are inclined in the other direction.

The upper output gear 143 has a lower surface formed with clutch teeth 158 which are so configured as to be engaged with the clutch teeth 154 of the upper surface of the pinion 152 (hereinafter referred to as upper pinion). Similarly, the lower output gear 144 has an upper surface formed with clutch teeth 161 which are so configured as to be engaged with the clutch teeth 157 of the lower surface of the other pinion 153 (hereinafter referred to as lower pinion). The intermediate output gear 145 has an upper surface formed with clutch teeth 159 so configured as to be engaged with the clutch teeth 155 of the lower surface of the upper pinion 152, and also a lower surface formed with clutch teeth 160 so configured as to be engaged with the clutch teeth 156 of the upper surface of the lower pinion 153. These clutch teeth 154 through 161 serve to transmit rotary motion during rotation in a direction in which they are engaged, but they ride across the corresponding inclined surfaces during rotation in the opposite direction and cause idle rotation, thus constituting a kind of one-way clutch mechanism which may be called "running face ratchet".

Each of the distances between the upper and intermediate output gears 143 and 145 and between the intermediate and lower output gears 145 and 144 is defined to be greater than the height of each of the upper and lower pinions 152, 153. As shown in FIG. 29, when the clutch teeth 155, 157 of the lower surfaces of the upper and lower pinions 152, 153 are engaged with the corresponding clutch teeth 159, 161, the clutch teeth 154, 156 of the upper surfaces of the pinions 152, 153 are out of engagement. On the contrary, when the clutch teeth 154, 156 of the upper surfaces of the upper and lower pinions 152, 153 are engaged with the corresponding clutch teeth 158, 160, the clutch teeth 155, 157 of the lower surfaces of the pinions 152, 1153 are out of engagement.

A vertical post 162 is inserted through the gear box 141 adjacent to and along a side wall 141B opposite to the side wall 141A through which the racks 148, 149 extend laterally. The post 162 is provided with lower and upper stoppers 163, 164. The lower stopper 163 is disposed in abutment against the inner bottom surface of the gear box 141, and the upper stopper 164 is positioned slightly below the inner upper surface of the gear box 141, permitting upward movement of the post 162, until the upper stopper 164 comes in abutment against the inner upper surface of the gear box 141.

Figure 32:
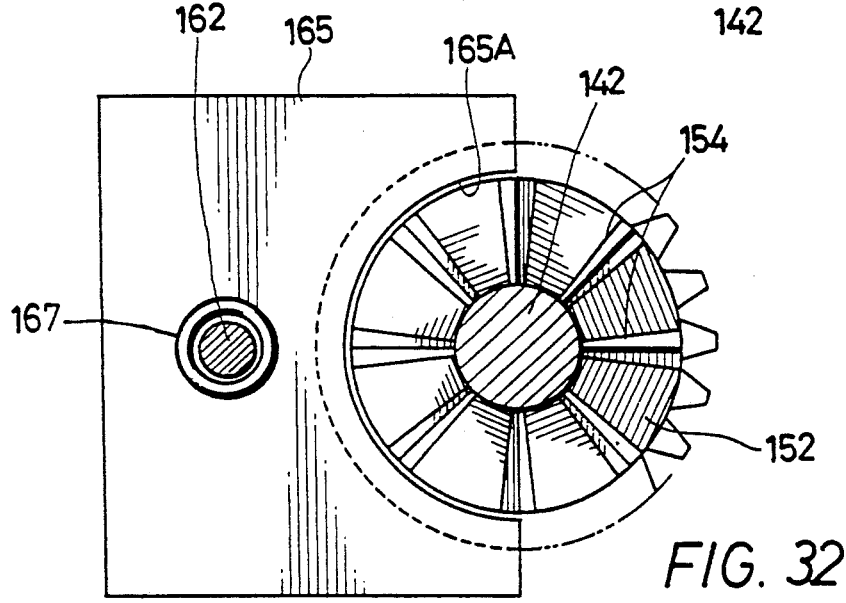
FIG. 32 is a plan view of a pinion supporting plate and a pinion of the screwdriver in FIG. 29.
Figure 33:
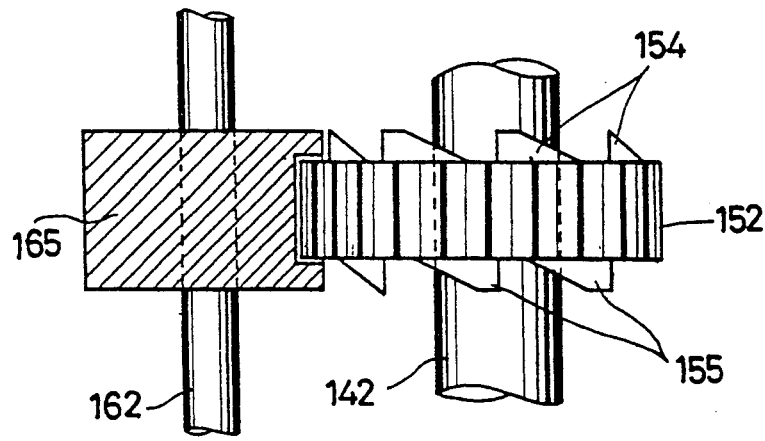
FIG. 33 is a side view of FIG. 32.

Upper and lower gear support plates 165, 166 are provided and are fixedly attached to the post 162. As shown in FIG. 33, the upper gear support plate 165 tightly holds upper and lower surfaces of the peripheral portion of the upper pinion 152. As shown in FIG. 32, the upper gear support plate 165 is formed with a semi circular cut out portion 165A, so that the upper pinion 152 may be supported by the upper gear support plate 165, with the clutch teeths 154, 155 exposed and held out of contact therewith. The lower gear support plate 166 is of the same configuration as the upper gear support plate 165 and tightly holds the lower pinion 153 in the same manner.

As shown in FIG. 30, spring means 167 are disposed between the upper and lower gear support plates 165 and 166, between the upper gear support plate 165 and upper inner surface of the gear box 141 and between the lower gear support plate 166 and the lower inner surface of the gear box 141 so as to position the upper and lower gear support plates 165, 166 adjacent to the upper and lower pinions 152, 153, respectively.

The post 162 has an upper end projecting above the upper surface of the gear box 141, and a cam member 169 is attached to the projecting upper end. The cam member 169 is provided with a handle 168 projecting laterally from a side thereof. When the handle 168 is pivotally moved in a direction shown by an arrow Y in FIG. 30 to rotate the cam member 169, the post 162 is lifted and held in this condition. When the handle 168 is pivotally moved in the opposite direction from this condition, the cam member 169 is rotated to lower the post 162 to the position shown in FIG. 30 and holds it in this condition.

In FIG. 30 in which the handle 168 is turned downwardly and the post 162 is at its lowered position, the gear support plates 165, 166 are also at their lower positions, so that the clutch teeth 159, 157 of the lower surfaces of the upper and lower pinions 152, 153 are engaged with the clutch teeth 159 of the upper surface of the intermediate output gear 145 and the clutch teeth 161 of the upper surface of the lower output gear 144, respectively. When the handle 168 is turned upwardly from this condition, the post 162 is lifted, and thus, the upper and lower gear support plates 165, 166 lift the upper and lower pinions 152, 153, respectively. Now, the clutch teeth 154, 156 of the upper surfaces of the upper and lower pinions 152, 153 are brought in engagement with the clutch teeth 158 of the lower surface of the upper output gear 143 and the clutch teeth 160 of the lower surface of the intermediate output gear 145, respectively.

The rotary tool of this embodiment operates as follows. It is assumed that the handle 168 is turned downwardly as shown in FIG. 30 and the clutch teeth 155, 157 of the lower surfaces of the upper and lower pinions 152, 153 are in engagement with the clutch teeth 159 of the upper surface of the intermediate output gear 145 and the clutch teeth 161 of the upper surface of the lower output gear 144, respectively.

In this condition, when the grip 150 and the gear box 141 are grasped together by a hand of a user, the racks 148, 149 are pushed into the gear box 141 which is defined hereinafter as forward movement of the racks 148, 149. The forward movement of the racks 148, 149 rotates the upper and lower pinions 152, 153 which are engaged with the racks 148, 149, respectively. At this time, the upper and lower pinions 152, 153 rotate in opposite directions relative to each other. As shown in FIG. 30, the clutch teeth 155 of the lower surface of the upper pinion 152 are brought in engagement with the clutch teeth 159 of the upper surface of the intermediate output gear 145, while the lower pinion 153 idly rotates. The engagement between the clutch teeth 155 and 159 permits rotation of the upper pinion 152 to be transmitted to the intermediate output gear 145, which in turn rotates the output shaft 142 in a direction which is defined hereinafter as the forward direction.

When grasp of the grip 150 by the hand is released, the racks 148, 149 are moved under the biasing force of the spring 151 in the direction projecting out of the gear box 141 which is defined hereafter as reverse movement of the racks 148, 149. The rotational directions of the upper and lower pinions 148, 149 are inverted in relation to the respective directions thereof during forward movement. The rotational directions of the upper and lower pinions are also opposite relative to each other. As shown in FIG. 30, the clutch teeth 157 of the lower surface of the lower pinion 153 are brought in engagement with the clutch teeth 161 of the upper surface of the lower output gear 144, while the upper pinion 152 idly rotates. The engagement between the clutches 157 and 161 permits rotation of the lower pinion 153 to be transmitted to the lower output gear 144, which in turn rotates the output shaft 142 in the same forward direction as the direction of rotation caused during the forward movement of the racks 148, 149.

Thus, when the racks 148, 149 are reciprocatingly moved through repeated grasp and release of the grip 150 by the hand, the clutches 155, 157 of the lower surfaces of the upper and lower pinions 152, 153 are alternately engaged with the clutch teeth 159, 161 of the upper surfaces of the corresponding output gears 145, 144, permitting the output shaft 142 to rotate in the forward direction during both the forward and reverse movements of the racks 148, 149. Therefore, when a screw is to be fastened for example, a driver tip 147 is attached to the chuck 146 and the grip 150 is repeatedly grasped and released, causing the output shaft 142 to be continuously rotated in the forward direction, which assures improved efficiency in operation. As this rotary tool does not require to impart torsional force in the direction of rotation of the output shaft as is the case with the prior art rotary tool, persons with weak muscular power can easily rotate the output shaft 142.

When it is desired to change the rotational direction of the output shaft 42, the handle 168 is turned upwardly to pull up the post 162. As described above, this causes the upper and lower pinions 152, 153 to be moved upwardly, so that the clutch teeth 154, 156 of the upper surfaces thereof are brought in engagement with the clutch teeth 158 of the lower surface of the upper output gear 143 and the clutch teeth 160 of the lower surface of the intermediate output gear 145. In this condition, when the grip 150 is repeatedly grasped and released to reciprocatingly move the racks 148, 149, the upper pinion 152 idly rotates and the clutch teeth 156 of the lower pinion 153 are brought in engagement with the clutch teeth 160 of the intermediate output gear 145 during forward movement of the racks 148, 149, so that the output shaft 142 may be rotated in the inverted direction. During the reverse movement of the racks 148, 149, the lower pinion 153 idly rotates and the clutch teeth 154 of the upper pinion 152 are brought in engagement with the clutch teeth 158 of the upper output gear 143, so that the output shaft 142 may be also rotated in the inverted direction.

When the racks 148, 149 are reciprocatingly moved through repeated grasp and release of the grip 150 by the hand, the clutch teeth 154, 156 of the upper surfaces of the upper and lower pinions 152, 153 are alternately engaged with the clutch teeth 158, 160 of the lower surfaces of the corresponding output gears 143, 145, permitting the output shaft 142 to rotate in the inverted direction during both the forward and reverse movements of the racks 148, 149.

Thus, the rotational direction of the output shaft 142 can be changed by pivotally operating the handle 168 for fastening and loosening a bolt or a nut.

Although the above embodiment has been described in relation to the straight racks 148, 149 which are parallel to each other and the grip 150 which is rectilinearly reciprocatingly movable, the racks 148, 149 may be designed to be, for example, parallel but arcuate in configuration and the grip is rotatable about a point so as to reciprocatingly move the racks 148, 149 in an arcuate path.

We claim:
1. A rotary tool comprising:
  a gear box to be grasped by the hand of a user; said gear box having an upper and a lower inner surface, a side wall with an upper and a lower opening;
  a rotatable output shaft vertically extending through said gear box and supported thereby, said output shaft having a lower end projecting through said lower inner surface of the gear box;
  two rack gears inserted through the side wall of said gear box at upper and lower openings thereof, said rack gears movable in and out of said gear box in a direction perpendicular to said output shaft, said rack gears having outer ends;
  a grip connecting said outer ends of the two rack gears and having a configuration to be grasped together with said gear box by the hand of the user;
  means for forcing said grip and thus said rack gears in a direction out of said gear box;
  a plurality of output gears enclosed in said gear box and mounted on said rotatable output shaft;
  a first and second gear-clutch mechanism disposed in said gear box;
  each of said first and second gear-clutch mechanisms including a pinion in engagement with one of said rack gears, and a one way clutch interposed between the pinion and each of said output gears;
  each said one-way clutch being operable so that one oneway clutch becomes idle while the other transmits clockwise rotation to said output shaft during inward movement of said grip against said means for forcing by the user and the other one-way clutch transmits clockwise rotation to said output shaft while the one becomes idle during outward movement of said grip in response to the forcing means;
  means for simultaneously changing the transmitting direction of said first and second gear-clutch mechanisms so that each clutch transmits counterclockwise rotation to said rotatable output shaft.

2. The rotary tool as defined in claim 1 wherein the pinion of each of said one-way clutch mechanisms is slidably movable relative to said rotatable output shaft; and wherein each said pinion is resiliently kept in position by a gear support plate disposed within said gear box.

3. The rotary tool as defined in claim 2 wherein said output gears are fixed to said rotatable output shaft and include a first output gear for engagement with the pinion of said first gear-clutch mechanism, a second output gear for engagement with the pinion of said second gear-clutch mechanism, and an intermediate output gear between said first and second output gear;

the pinion of said first gear clutch mechanism is disposed between said first output gear and said intermediate output gear and the pinion of said second gear clutch mechanism is disposed between said intermediate output gear and said second output gear; and said means for simultaneously changing is operable to move said gear support plate in an axial direction of said rotatable output shaft between a first position and a second position, said support plate at said first position brings the pinion of said first gear-clutch mechanism into engagement with said intermediate output gear while the pinion of said second gear-clutch mechanism is brought into engagement with said second output gear, and said support plate at said second position brings the pinion of said first gear-clutch mechanism into engagement with said first output gear while the pinion of said second gear-clutch mechanism is brought into engagement with said intermediate output gear.

* * * * *